June 20, 1933. W. GROTHKOPP 1,914,565
GRINDING MEASURING DEVICE
Filed Sept. 30, 1927 4 Sheets-Sheet 4
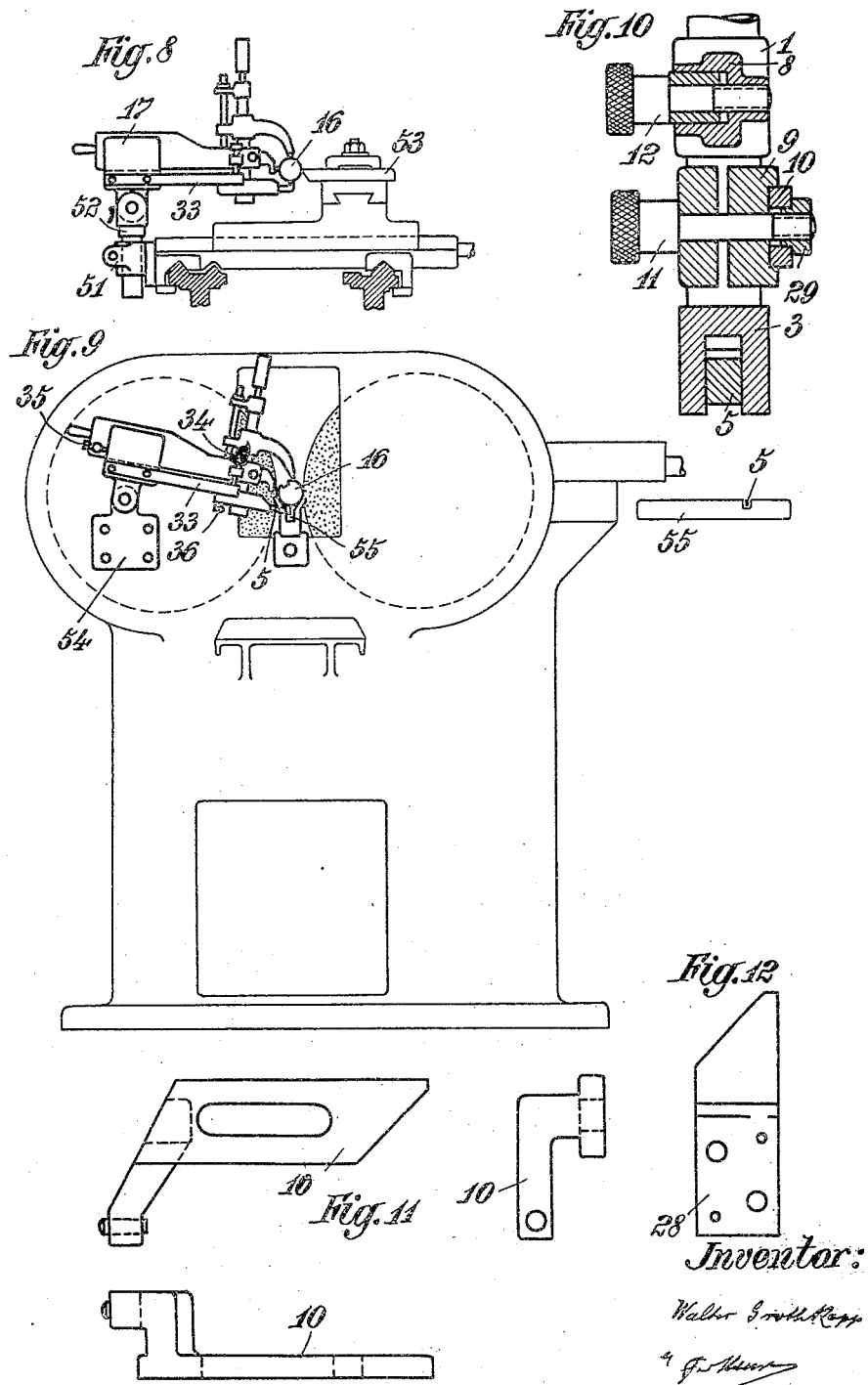
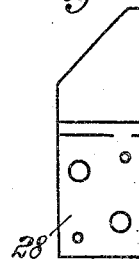

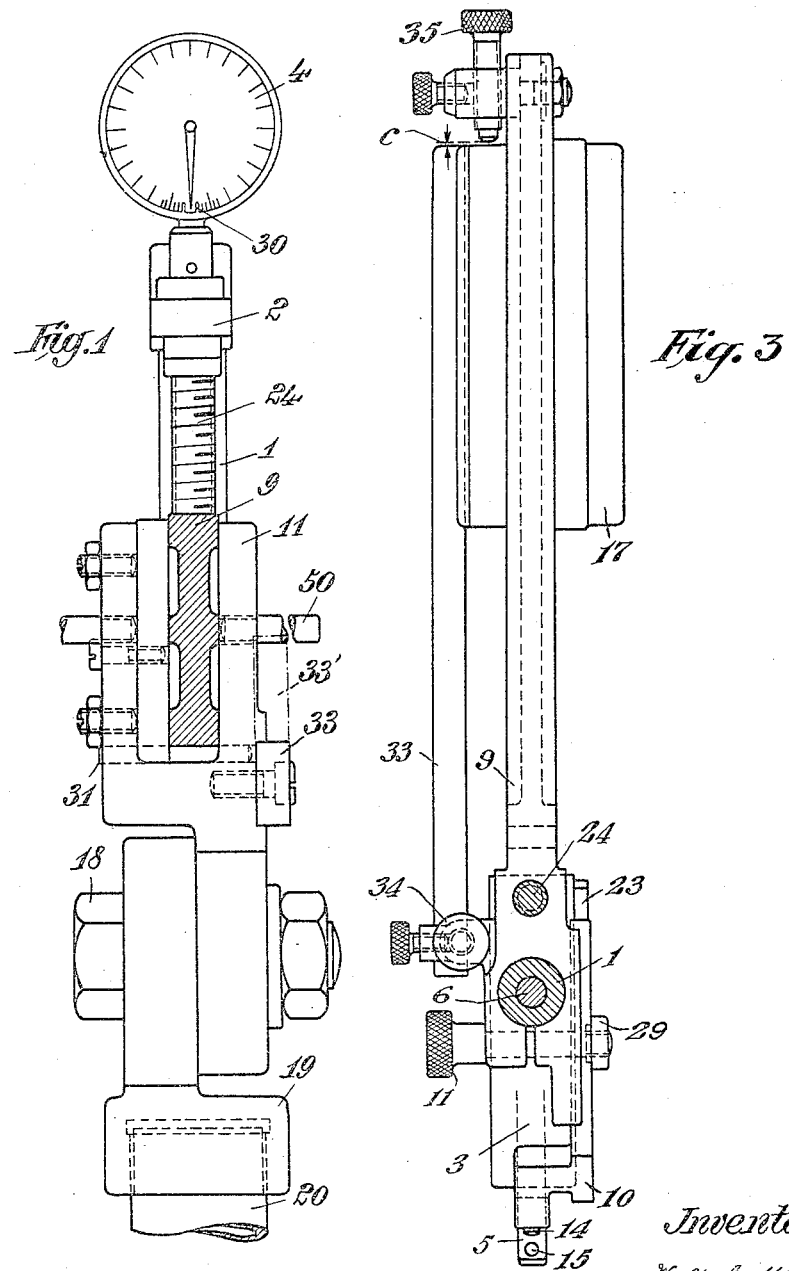

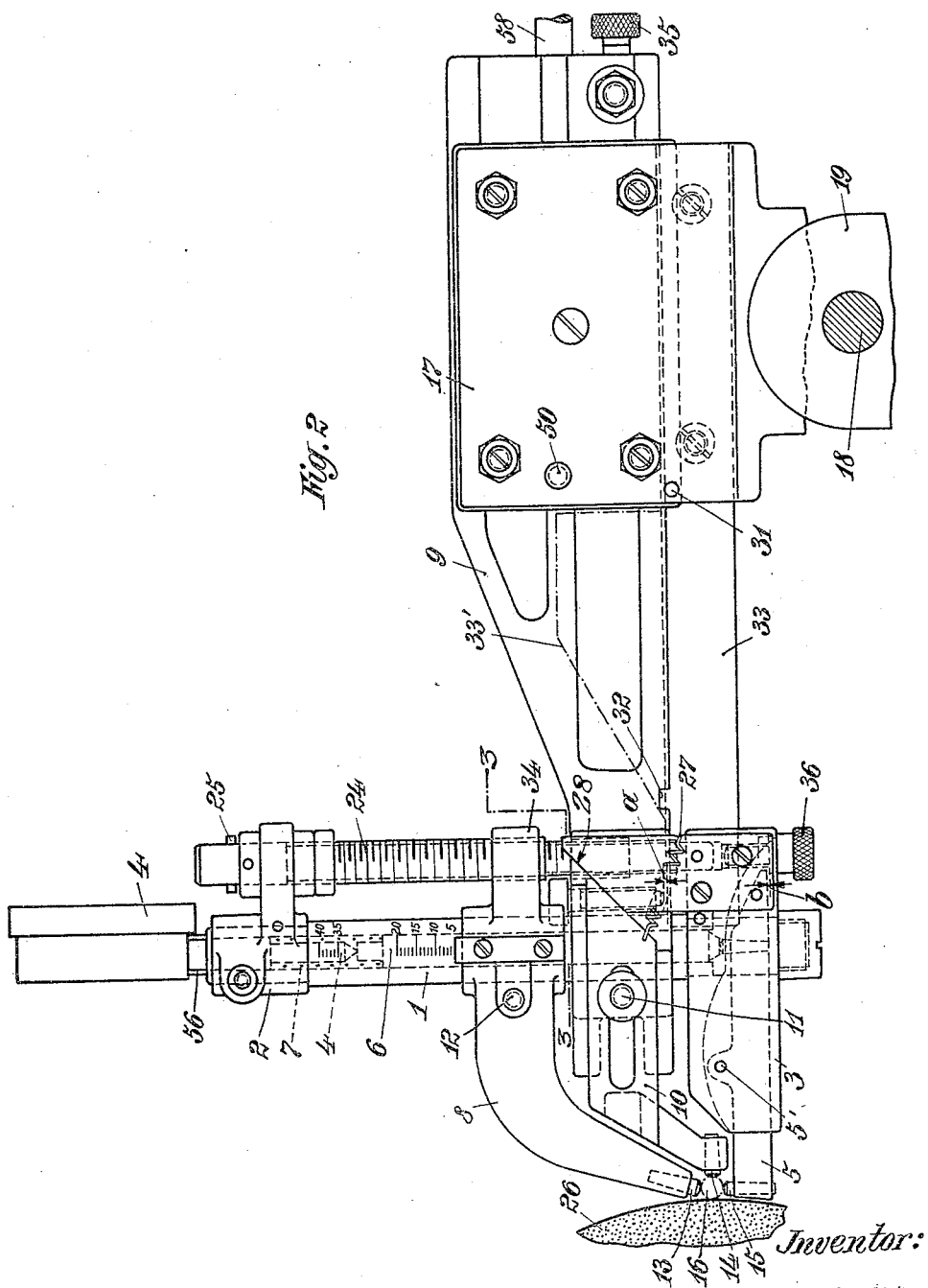

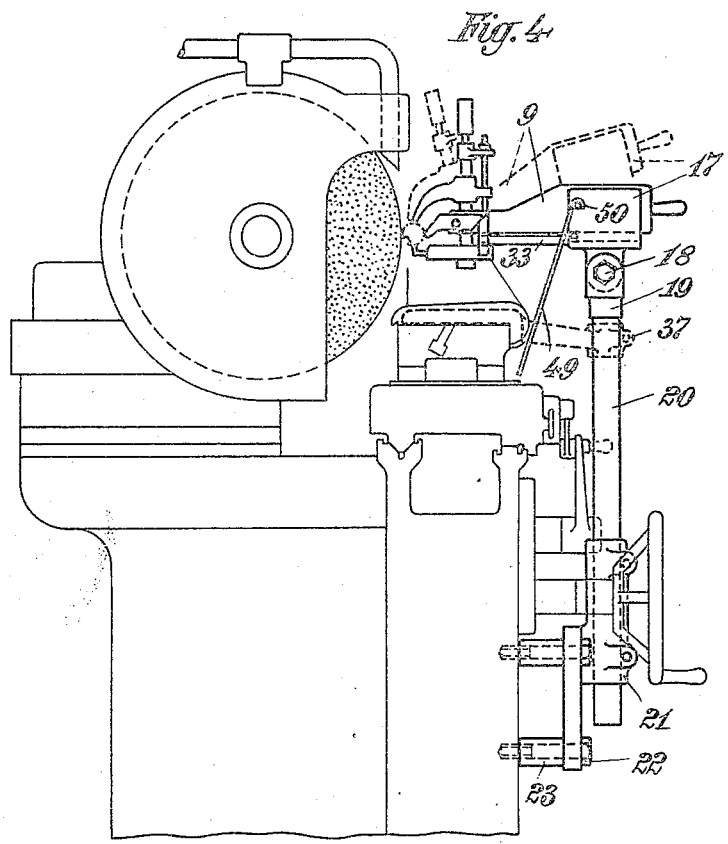
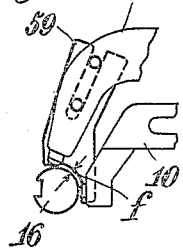
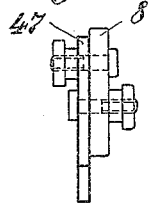
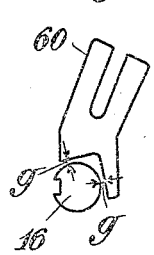

Patented June 20, 1933

1,914,565

UNITED STATES PATENT OFFICE

WALTER GROTHKOPP, OF BERLIN-LICHTENBERG, GERMANY

GRINDING MEASURING DEVICE

Application filed September 30, 1927, Serial No. 223,136, and in Germany October 5, 1926.

This invention relates to an instrument for measuring rotating blanks during the treatment and which is characterized in that the measuring instrument, which has preferably a scale with pointer or a dial micrometer, comprises a rearward shaft, a supporting bracket for the shaft of the measuring instrument being provided on the frame or on the table of the machine-tool designed for working the blank to be measured, for instance a circular grinding machine with centres, a circular grinding machine without centres, a lathe, a screw cutting machine, a turret lathe or the like, said bearing bracket preventing that the measuring instrument, resting by its support on said bracket, be pulled along by the rotating blank.

The measuring instrument, according to the invention, is utilized in such a manner that the gauge, which forms the measuring instrument proper, is adjusted with the aid of a finished work or of a gauge-block, whereupon, by means of the measuring instrument, the continuous chip removing is observed on the micrometer until the correct diameter of the blank has been obtained. The blank being finished, the measuring instrument is pulled back, the finished blank is removed, a new blank inserted and the measuring instrument brought into contact with said blank, the bearing bracket being adjusted so that the measuring instrument is held in contact with the blank by its own gravity.

A measuring instrument, according to the invention, can further be developed so that it preserves permanently automatically a correct perpendicular position to the axis of the blank and so that it is possible to measure with the same grooved blanks, care being taken that the feeling pins of the measuring instrument can penetrate into the groove only to a predetermined depth.

Several embodiments of the invention are illustrated, by way of example, in the accompanying drawings, in which Fig. 1 shows a measuring instrument in end elevation.

Fig. 2 is a side-elevation of Fig. 1.

Fig. 3 a section on line 3—3 of Fig. 2.

Fig. 4 shows in side-elevation a measuring instrument mounted on a circular grinding machine.

Figs. 5 to 7 show the arrangements for making it possible to use the measuring instrument in connection with grooved blanks.

Fig. 8 shows the measuring instrument mounted on a lathe.

Fig. 9 shows the measuring instrument mounted on a centreless grinding-machine.

Fig. 10 is a vertical section on the plane of the clamping screws 11 and 12 of Fig. 1.

Fig. 11 shows the arm 10 in side and end elevation and in top plan view.

Fig. 12 shows the part 28 in side elevation.

In the form of construction shown in Figs. 1 to 4 the frame of the measuring instrument, formed substantially by a bar board in longitudinal direction, is designated by 1. With the bar 1 a top part 2 and a bottom part 3 are rigidly connected. In the top part 2 a micrometer 4 is arranged, and in the lower part 3 a rocking lever 5 is mounted on an axle 5' and forms the lower measuring arm of the measuring instrument. Between the lower measuring arm 5 and the micrometer 4 a bolt 6 is arranged which is pressed against the rocking lever 5 by the action of a spiral spring 7, attached at the upper end to the shaft of the micrometer 4, said bolt serving to transmit to the micrometer the amplitude of the oscillation of the lever 5 from the adjusted normal position. A rubber sleeve 56 is pulled over the shaft of the micrometer to protect the same against the grinding water.

An upper measuring arm 8 and a bracket 9, of any desired cross-section, are adjustably mounted on the bar 1 and actuated by means which will be hereinafter described. A central measuring arm 10 is mounted on the inner end of the bracket 9 so that it is slidable in horizontal direction and it has an abutment pin 14, whilst the other measuring arms 5 and 8 have similar abutment pins 13, 15 respectively. A clamping screw 11 and nut 29 (Figs. 2 and 3) are adapted to clamp the bracket 9 and the central measuring arm 10 against the bar 1 to which the upper measuring arm 8 can also be clamped by means of a clamping screw 12.

When the machine is working the abutment pins 13, 14 and 15 are pressed against the blank 16 to be measured over an angle of more than 180° so that the angle between the point of contact of each abutment pin and that of the one next following amounts to more than 90°. The bracket 9 of the measuring gauge is, in the form of construction shown in Figs. 1 to 4, guided in a support 17, having an upper fork-shaped portion and adjustable in a plane perpendicular to the axis of the blank 16. The support 17 may otherwise be constructed in any convenient manner. The support 17 is hingedly connected by a bolt 18 with a head 19 screwed on a drawn steel tube 20 which is adjustably connected to a bracket 21 secured to the frame of the machine tool by means of screws 22 and of intermediate sleeves 23. An upper position of the support 17 is shown in Fig. 4 in dash and dot lines and in this position the measuring instrument assumes also a forwardly inclined position so that the bearing surface of the bracket 9 slides on the corresponding portion of the support 17 and the gauge is pressed against the blank 16 by gravity.

If a conical blank with a high pitch has to be gauged, the measuring instrument must reciprocate together with the plate of the grinding machine and with the blank, so that the same is gauged always only in a cross sectional plane. In this case a socket member 37, as indicated in dotted lines in Fig. 4, is adapted to receive the steel tube 20 rigidly connected with the table of the machine. A protecting metal plate 49 (Fig. 4) is provided to protect against grinding water, said plate being hingedly connected to lateral pins 50 of the support 17 (Figs. 1, 2 and 4).

A screw spindle 24 rotatably mounted in the top part 2 and bottom part 3 of the gauge frame serves for rough adjustment of the gauge with respect to the scale on the bar 1. This screw spindle 24 has two threaded portions of different pitches. The threaded portion having pitch double that of the other portion engages with the upper measuring arm 8 while the threaded portion having the lower pitch engages the bracket 9. When the threaded spindle 24 is operated, for instance by means of a slit key gripping over a catch pin 25 on the upper end of said spindle 24, the upper measuring arm 8 will be shifted on the bar 1 always twice the distance of the bracket 9 wherefrom results that, at every adjusting of the upper measuring arm 8, the abutment pin of the central measuring arm is always adjusted accurately upon the axis of the blank 16.

In the adjusting of the gauge shown in Fig. 2 it is supposed that the blank possesses the smallest possible diameter. When the gauge has, therefore, to be adjusted to a greater diameter, the upper measuring arm 8 and the bracket 9 must be shifted upward along the bar 1 the central measuring arm 10 moving at the same time back in horizontal direction, as the pins 13 and 15 must always remain in the same plane with regard to the blank 16 so as not to come into contact with the grinding disk 26. The shifting of the central measuring arm in horizontal direction forward or backward is carried out automatically as the rear surface of the measuring arm 10 inclined at an angle of 45° is constantly pulled by a spiral spring 27 against an edge 28, which is inclined at an angle of 45° and forms part of the bottom part 3 of the gauge frame. By the arrangement described it is attained that, at an adjusting of the upper measuring arm 8, the abutment pin 14 of the central measuring arm 10 is adjusted in accordance with the diameter of the blank to be measured.

A precise adjusting is effected with the aid of the rotatable scale disk of the micrometer 4 (Figs. 1 and 2), so that the pointer stands between the two indicia 30.

The gauge together with the bracket 9 is tiltable in the working position on the supporting pin 31 of the fork-shaped support 17 and the weight of the measuring instrument may be equalized by accordingly loading the handle 58 of the bracket 9, in such a manner that no vertical pressure worth mentioning is exerted upon the blank 16. After the blank has been finished, the gauge is pulled back till an indentation 32 of the bracket engages the pin 31 for braking until another blank has been inserted into the tool, whereupon the gauge is released and again placed against the blank.

In order to make it possible to bring the gauge rapidly and securely against the blank 16, and in order to avoid damaging of the abutment pins 13, 14 15 at this occasion, a guide element 33 is fixed on the fork-shaped support 17 so that it is directed from this support 17 towards the blank 16.

On this guide bar 33 the gauge bears by means of a screw 34 which is adjusted so that, after the pin 13 has touched the work, the distance between the lower end of the screw 34 and the guide element amounts to a very small measure $a$, for instance 0.1 mm. (Fig. 2).

In the form of construction of the measuring instrument shown in Figs. 1 to 4 a screw 35 is further arranged on the rear end of bracket 9, and the front end of said screw is during the operation of the measuring instrument, only spaced from the rear end of the support 17 a very short distance $c$. Into the rear end of the bottom part 3 a screw 36 is further screwed which limits the amplitude of the upward oscillation of the abutment pin 15. By accordingly adjusting of the three screws 34, 35, 36, at the measure $a$, $b$, $c$, it can consequently be obtained that, at the measuring of grooved works, the pins 13, 14, 15 penetrate into the grooves only very short distances and consequently slide back into their former positions every time after the grooves have passed along, the movements of the rocking lever 5 being accurately indicated on the micrometer. Also the construction of the abutment pins 13, 14 and 15 with spherical heads prevents the pins from hooking in the grooves.

While, when the measuring instrument is used in connection with circular grinding machines having plane tables (Fig. 4), the guide element 33 has a straight horizontal surface, the guide element must have an inclined surface when the measuring instrument has to be used in connection with circular grinding machines with so-called Norton-table as is illustrated in Fig. 2 at 33′ in dash-and-dot lines. When the guide element is constructed in this manner, the gauge slides at the backward movement automatically over the vertical bar of the Norton-table and is automatically lifted over the bar, so that sufficient space is left for inserting a fresh blank.

If desired, the abutments 13 and 14 may be united to one abutment, as shown in Figs. 5 and 7, i. e. to an abutment 59 or to an abutment 60 screwed onto the upper measuring arm 8. The bearing surface of this abutment 59 or 60 with regard to the blank is of round or prismatic shape, and the distance of this surface from the blank, the measures $f$ and $g$, amounts, when the measuring instrument is being used, again to only about 0.1 mm.

Fig. 8 illustrates how a measuring instrument according to the invention is mounted on a lathe.

On the rear end side of the carriage of the lathe a bracket 51 is fixed in which the carriage 52 is mounted so that it can rotate and be adjusted in vertical direction. On the carriage 52 the forked guide-bracket 17 is hingedly fixed and, as can also be seen from the drawings, the lathe, when being used, does not impede in any manner the adjusting and working of the turning tool 53.

The measuring instrument may be mounted in a similar manner on turret lathes, screw-cutting machines and the like.

In Fig. 9 the measuring device is illustrated mounted on a centreless circular grinding machine. In this form of construction the bracket 54 is mounted by means of screws on the end wall of the machine, and the forked guide bracket 17 for the shaft of the gauge is hingedly fixed on the bracket 54. The blanks 16, which have been ground, slide, when coming from the space between the grinding wheels, through the abutment pins of the gauge, which bear against it, and are measured at this occasion, as the rocking lever 15 can freely move in a vertical cut out portion of the guide bar 55 for the guiding of the ground works. Hooking of the abutment pins of the gauge on a fresh blank arriving in the measuring position can be avoided also in this form of construction by correct adjusting of the screws 34, 35 and 36 (Figs. 2, 3 and 9) and by the spherical shape of the bearing surface of the pins 13, 14 and 15. It is no longer necessary to move the gauge back after the measuring of each blank so that the gauge remains in its adjusted position.

I claim:—

1. A measuring instrument for the automatic measuring of the circumference of a rotating blank, comprising in combination, a carrying frame including a bar with graduations, a top part and a lower part carried by said graduated bar, a spindle having two threaded portions of different pitch, an upper measuring arm for said blank guided on said graduated bar and adapted to be adjusted relatively to said graduated bar by the upper threaded portion of said spindle, a rearwardly extending bracket adjustably mounted on said carrying frame, a middle measuring arm adapted to be guided and adjusted by said bracket, a lower measuring arm oscillatably mounted on said lower part, a guide element on said bracket having an inclined guide surface for supporting and guiding said middle measuring arm, said arm having a similarly inclined guide surface for engagement with said first guide surface, a pull spring pressing said middle measuring arm against said guide element, a support for guiding said bracket, a carrying rod adjustably mounted on said machine frame and hingedly connected to said support, a transverse bolt on said support serving as support for said bracket, said bracket having in its lower surface a cavity with which said transverse bolt engages when said bracket is in the inoperative position.

2. A measuring instrument for the automatic measuring of circumference of a rotating blank, comprising in combination with the machine frame, a frame, a vertically shiftable arm, a horizontally shiftable arm, a rocking arm, said frame carrying all three of said arms, means for adjusting said arms with regard to said blank, a rearwardly extending bracket on said carrying frame adapted to cooperate with said horizontally shiftable arm, a support adjustably and tiltably mounted on said machine frame, a cross bolt in said support serving as a tilting axle for said bracket, means for slidably supporting said support whereby it may be moved to inoperative position, means for maintaining said bracket in inoperative position, abutment pins, one in the end of each of said three arms adapted to press against the blank by gravity of said arms, said pins standing at an angle of over 90° apart.

3. In a measuring instrument for the automatic measuring of the circumference of rotating blanks as specified in claim 2, in combination with the upper measuring arm, the lower measuring arm the bracket and the carrying frame, a lower cross bar of said carrying frame carrying said lower measuring arm, adjustable screws in said upper measuring arm, in said bracket and in said lower cross bar respectively adapted to limit the oscillating movements of said three last-named elements.

4. A measuring instrument for the automatic measuring of the circumference of rotating blanks having grooves as specified in claim 2, comprising in combination with the measuring arms and their abutment pins, a rounded head on the end of each abutment pin adapted to prevent hooking in the grooves of the blank.

In testimony whereof I affix my signature.

WALTER GROTHKOPP.